(12) United States Patent
Cai

(10) Patent No.: US 7,808,802 B2
(45) Date of Patent: Oct. 5, 2010

(54) ISOLATED SWITCHED-MODE POWER SUPPLY WITH OUTPUT REGULATION FROM PRIMARY SIDE

(75) Inventor: Jun Cai, 11012 foxmouth Cir., Mather, CA (US) 95655

(73) Assignee: Jun Cai, Mather, CA (US)

( * ) Notice: Subject to any disclaimer, the term of this patent is extended or adjusted under 35 U.S.C. 154(b) by 457 days.

(21) Appl. No.: 11/850,998

(22) Filed: Sep. 6, 2007

(65) Prior Publication Data
US 2009/0067201 A1    Mar. 12, 2009

(51) Int. Cl.
*H02M 3/335* (2006.01)
(52) U.S. Cl. ............... 363/21.12; 363/21.17; 363/21.18
(58) Field of Classification Search ............. 363/21.12, 363/21.14, 21.17, 21.18, 26, 21.04, 25
See application file for complete search history.

(56) References Cited

U.S. PATENT DOCUMENTS

| | | | |
|---|---|---|---|
| 5,699,237 A | 12/1997 | Seragnoli et al. | |
| 6,208,532 B1 | 3/2001 | Preller et al. | |
| 6,233,161 B1 | 5/2001 | Balakrishnan et al. | |
| 6,333,624 B1 | 12/2001 | Ball et al. | |
| 6,385,059 B1 * | 5/2002 | Telefus et al. | 363/21.15 |
| RE37,898 E | 11/2002 | Seragnoli et al. | |
| 6,608,768 B2 | 8/2003 | Sula et al. | |
| 6,678,172 B1 * | 1/2004 | Zhang et al. | 363/21.14 |
| 6,754,089 B2 | 6/2004 | Balakrishnan et al. | |
| 6,807,072 B2 * | 10/2004 | Tanabe et al. | 363/25 |
| 6,853,563 B1 * | 2/2005 | Yang et al. | 363/21.15 |
| 6,879,498 B2 | 4/2005 | Balakrishnan et al. | |
| 6,958,920 B2 | 10/2005 | Mednik et al. | |
| 6,995,986 B2 | 2/2006 | Balakrishnan et al. | |
| 7,027,313 B2 * | 4/2006 | Amei | 363/21.12 |
| 7,142,437 B2 | 11/2006 | Park | |
| 7,400,126 B2 * | 7/2008 | Iwashita | 323/286 |
| 2007/0041223 A1 | 2/2007 | Smidt et al. | |

* cited by examiner

*Primary Examiner*—Jeffrey L Sterrett
*Assistant Examiner*—Fred E Finch, III

(57) ABSTRACT

Embodiments disclosed herein describe an isolated switched-mode power supply with its output regulated from the primary side, by generating a sensing current using a sensing element coupled to the output of the power supply, and measuring a scaled version of the sensing current which depends on the output voltage, and calculating an estimate voltage representing the output voltage, and regulating the output of the isolated switched-mode power supply based on the estimate voltage.

20 Claims, 4 Drawing Sheets

ISOLATED SWITCHED-MODE POWER SUPPLY WITH OUTPUT REGULATION FROM PRIMARY SIDE

CROSS REFERENCE TO RELATED APPLICATIONS

Not applicable.

FIELD OF INVENTION

This invention relates to an isolated SMPS(switched-mode power supply) with the output regulated from the primary side.

BACKGROUND OF INVENTION

A SMPS(switched mode power supply) often has its input and output isolated to provide the required electrical safety, to be able to have different ground potentials or to minimize the possible noise coupling. An isolated SMPS usually has a power transformer with its primary side coupled to the SMPS's input and its secondary side coupled to the SMPS's output, and the power transformer delivers the power while providing the isolation from SMPS's input to output.

To regulate the SMPS's output, many prior arts used an optocoupler or a pulse transformer to pass a feedback signal from the SMPS's output to its input. The optocoupler is expensive and may wear out and change its characteristics over time to affect the control loop stability. The pulse transformer also has a shortcoming of being bulky and expensive. Some prior arts used a third winding, also called tertiary winding, in the power transformer to detect a feedback signal, but this will make it more difficult and more expensive to manufacture the power transformer.

Some prior arts did the feedback and control only at the secondary side of the power transformer, using post-regulator or post-switches, which usually resulted in additional power loss and lower efficiency. And some prior arts did output regulation from the primary side of the power transformer, by measuring a reflected output voltage coming from the secondary side. This method has some issues: first the reflected output voltage could be of high voltage value which makes the measurement difficult. Secondly the reflected output voltage did not accurately represent the actual output voltage since it also included a forward diode drop voltage at the secondary side whose variation could add substantial inaccuracy.

Hence it is highly desirable to improve techniques for an isolated SMPS to regulate its output.

This invention disclosed methods and structures for an isolated SMPS to be able to more accurately regulate its output from the primary side without using an optocoupler, additional pulse transformer or a tertiary winding, therefore to reduce cost, reduce layout size, improve reliability and improve accuracy.

SUMMARY

The methods and structures disclosed by this invention have a sensing element at the secondary side of the power transformer of an isolated SMPS(switched-mode power supply) which can generate a sensing current based on the SMPS's output voltage. A scaled version of this sensing current can be measured at the primary side of the power transformer, thus the output voltage can be estimated and hence regulated. With the SMPS's output voltage estimated and regulated from the primary side, it can also be done to estimate and regulate other SMPS's output parameters, such as output current, output power, from the primary side.

One embodiment disclosed in this invention shows an isolated flyback type SMPS with its output voltage regulated from SMPS's primary side. This embodiment has only one power switch at the primary side, which connects to the coil of the power transformer and turns on and off to make the power transformer to transfer energy.

Another embodiment disclosed in this invention shows an isolated flyback type SMPS with its output voltage regulated from SMPS's primary side. This embodiment has two power switches at the primary side to lower the voltage stress on the power switches.

One of the objectives of this invention is to provide a solution of isolated SMPS with extremely low component counts, low cost, small size, high accuracy and high reliability. This invention discloses methods and structures to get rid of the bulky and expensive optocoupler or pulse transformer which can not be easily integrated, and avoid measuring high voltage values, so more circuitry components can be integrated into a single die.

The typical application of this invention can be an AC-DC converter, an AC-DC charger, a POE(power over Ethernet) power converter, or other applications where an isolated SMPS is needed.

BRIEF DESCRIPTION OF THE DRAWINGS

Embodiments of the invention relating to both structures and methods of operation may best be understood by referring to the following descriptions and accompanying drawings.

DETAILED DESCRIPTION

An isolated SMPS(switched-mode power supply) usually has an energy transfer element, which can be a power transformer whose primary side connected to a or a group of power switches and an input power, and a control block to control the power switch to rapidly turn on and off to transfer the energy from the primary side to the secondary side of the power transformer. The secondary side of the power transformer is usually connected to a rectifying element, such as a diode, and an energy storage element such as a capacitor. The energy will eventually be transferred to the energy storage element through the rectifying element, and can be put out as the SMPS's output. The control block can adjust the on and off time of the power switch to control how much energy to be transferred from the input power to the storage element which will affect the output voltage on the energy storage element.

In the methods and structures disclosed in this invention, there is a sensing element, at the output side of the isolated SMPS which is also the secondary side of the power transformer, coupled to the energy storage element. This sensing element can generate a sensing current based on the output voltage on the energy storage element. And there is also a measuring block, at the input side of the isolated SMPS which is also the primary side of the power transformer, coupled to the primary side of the power transformer and measure a scaled version of the sensing current to calculate an estimate voltage representing the output voltage on the storage element. The estimate voltage is used by the control block to adjust the on and off time of the power switch thus the output voltage on the storage element can be regulated against a target value.

In following paragraphs embodiments of this invention with flyback type isolated SMPS will be shown for example to explain the concept of the invention in detail. However it should be understood that it is not intended to limit the invention to the particular structures and methods disclosed, but on the contrary, the intention is to cover all the structure and method modifications, equivalents and alternatives falling within the scope of the invention defined by the appended claims.

Figure 1A:
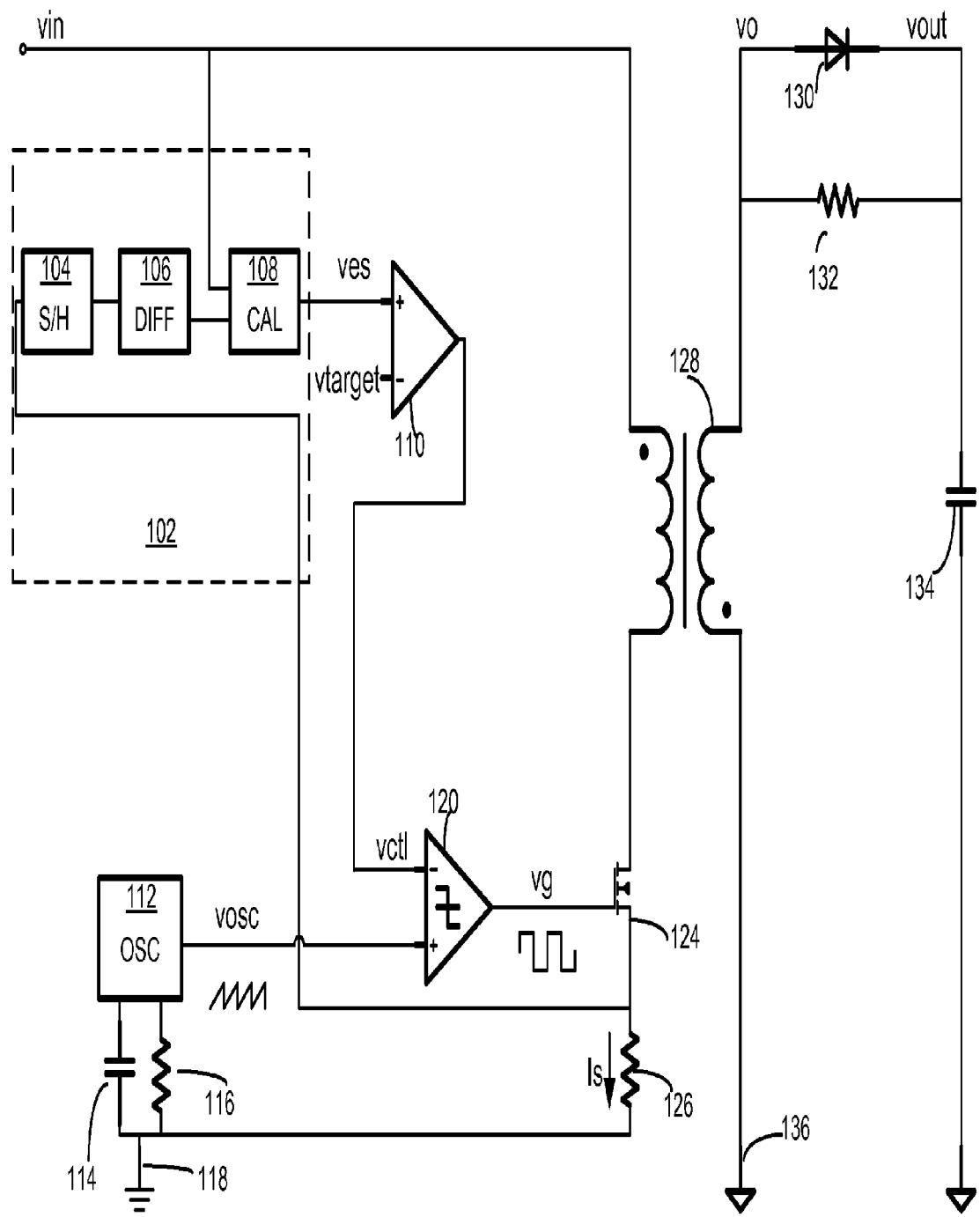
FIG. 1A shows an embodiment of this invention with an isolated flyback type SMPS(switched-mode power supply) with single power switch.
Figure 1B:
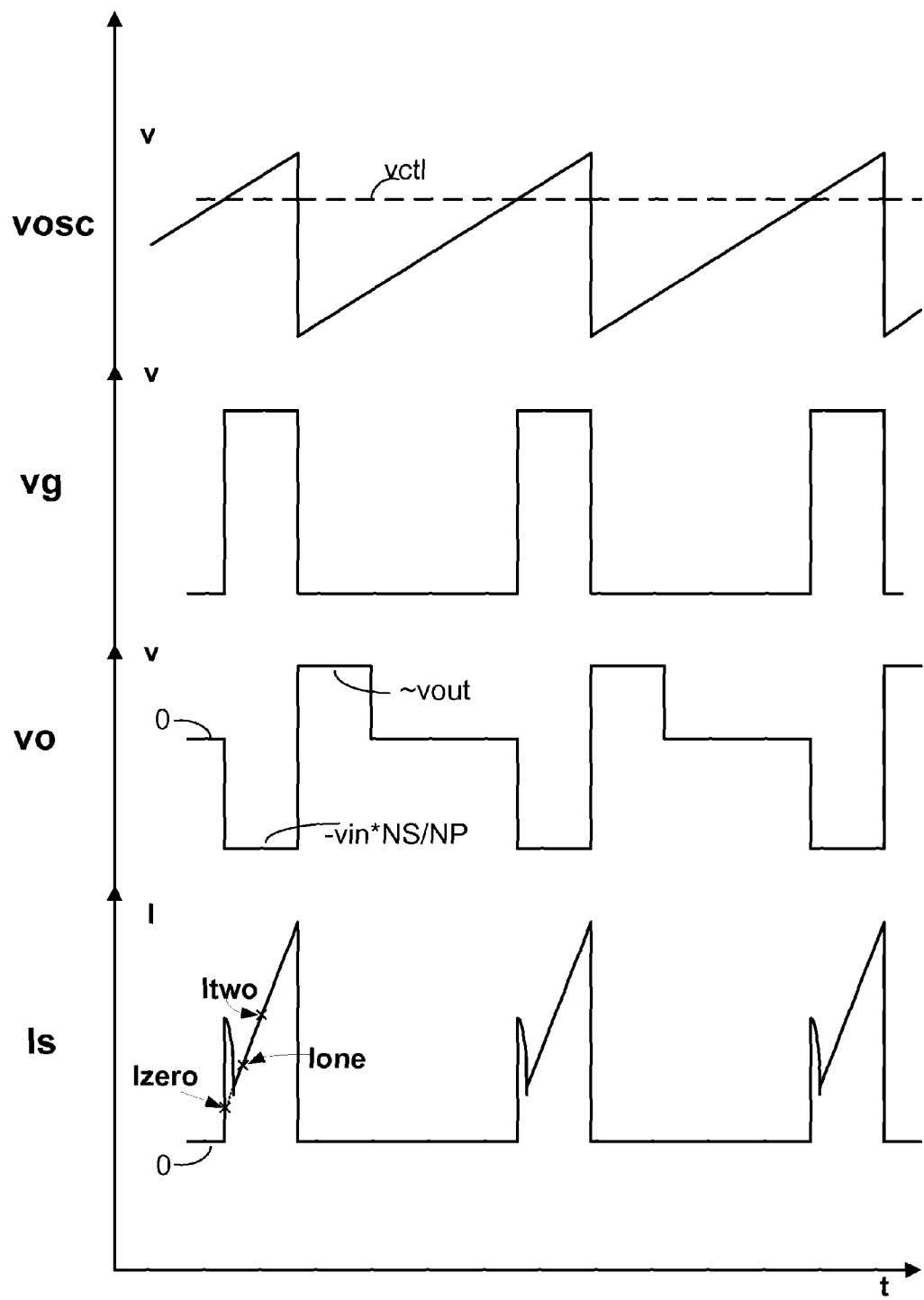
FIG. 1B shows the waveforms for the embodiment in FIG. 1A.

FIG. 1A shows an embodiment of the invention which includes an isolated flyback type SMPS with single power switch using voltage mode control and working in DCM (discontinuous conduction mode). FIG. 1B shows the waveforms for the embodiment in FIG. 1A.

In FIG. 1A, the embodiment includes a power transformer 128 which contains a primary winding and a secondary winding. The power transformer 128 has its primary side connected to an input voltage vin and a power switch 124, which is a NMOS transistor in this embodiment, and its secondary side connected to a secondary side ground 136 and a node vo. At the secondary side of the power transformer 128, a rectifying element 130, which is a diode in this embodiment, connects to the vo and a node vout which is the output of the SMPS. There is an energy storage element 134, which is a capacitor in this embodiment, connected to the vout and the secondary side ground 136. At the primary side of the power transformer 128, there is a resistor 126 connected between the source of the power switch 124 and a primary side ground 118. The current flowing through the resistor 126 is represented by a Is, which is also the same current flowing through the power switch 124. There is an oscillator 112 generating a sawtooth waveform with period depending on a capacitor 114 and a resistor 116 connected to the oscillator 112. The output of the oscillator 112 connects to a node vosc and is compared to the voltage on a node vctl by using a slicer 120. The output of the slicer 120 is of square waveform and connects to a node vg, which controls the gate of the power switch 124. Also there is an amplifier 110 which compares the voltage on a node ves to the voltage on a node vtarget and its output connects to the vctl. Above elements forms a typical flyback type SMPS. The amplifier 110, the oscillator 112, the capacitor 114, the resistor 116 and the slicer 120 performs a control function to adjust the on and off time of the power switch 124 based on how the ves is compared to its target value vtarget. If the ves becomes bigger compared to the vtarget, the vctl increases which will make the power switch 124 to be on shorter, so less energy will be transferred to the energy storage element 134 and consequently the voltage of the vout will decrease. And if the ves becomes smaller compared to the vtarget, the vout will increase.

In FIG. 1A, the embodiment also has a sensing element 132, which is a resistor in this embodiment, connected in parallel with the rectifying element 130 to the SMPS's output vout, and the sensing element 132 will generate a sensing current flowing through itself whose value is equal to the voltage difference across the sensing element 132 divided by the resistance of the sensing element 132. Since the SMPS in the embodiment is of flyback type and works in DCM mode, so when the vg is high and the power switch 124 is turned on, if there was not the sensing element 132, the current flowing through power switch 124, which can be represented by the Is, should start to ramp up linearly from 0. But since there is the sensing element 132, the Is instead will start to ramp up linearly from a current value represented by a Izero. The value of the Izero equals to the (vout+vin*NS/NP)*(NS/NP)/R, where NS is the number of turns of the secondary side coil of the power transformer 128, the NP is the number of turns of the primary side coil of the power transformer 128, and the R is the resistance of the sensing element 132. The NS/NP is also called the transfer ratio of the SMPS. At the moment when the power switch 124 is turned on, the sensing current is equal to (vout+vin*NS/NP)/R, so the Izero is a scaled version of the sensing current of sensing element 132 at the moment when the power switch 124 is turned on. Thus by measuring the Izero and knowing the value of the vin, the transfer ratio of the SMPS and the value of R, we can calculate an estimate voltage representing the vout.

In FIG. 1A, the embodiment also includes a measuring block 102 which measures the Is, a scaled version of the sensing current and calculate the estimate voltage ves which represents the vout. The measuring block 102 includes a sample and hold circuit 104, a differentiation circuit 106 and a calculating circuit 108. The sample and hold circuit 104 samples the values of the Is by measuring the voltage across the resistor 126 at two different times. As shown in FIG. 1B, at the beginning moment when the power switch 124 turns on, there is a transient current glitch in the Is. So to be able to measure the value of the Izero accurately, the sample and hold circuit 104 samples the Is after a time interval when the current glitch is gone, and then samples again after another time interval of same duration. The measured values of Is are the Ione and Itwo respectively. Since the Is is ramping up linearly, the differentiation circuit 106 in FIG. 1A can do a differentiation of the Ione and the Itwo to get the value of Izero, which is equal to twice of Ione minus the Itwo. In FIG. 1A the calculating circuit 108 calculates the estimate voltage ves which representing the vout, based on the values of the Izero, the vin, the transfer ratio of the SMPS and the resistance R of the sensing element 132.

As shown in FIG. 1A, if the vout becomes bigger than its target value vtarget, the estimate voltage ves increases which will make the power switch 124 to be on shorter, so less energy will be transferred to the energy storage element 134 and this consequently will cause the vout to decrease. And if the vout becomes smaller than its targeted value vtarget, the estimate voltage ves decreases which will make the power switch 124 to be on longer, so more energy will be transferred to the energy storage element 134 and this consequently will cause the vout to increase. Thus a control loop is closed to be able to regulate the vout, which is at the secondary side of the power transformer 128, from the primary side of the power transformer 128, without using an optocoupler, a pulse transformer or a tertiary winding.

Figure 2A:
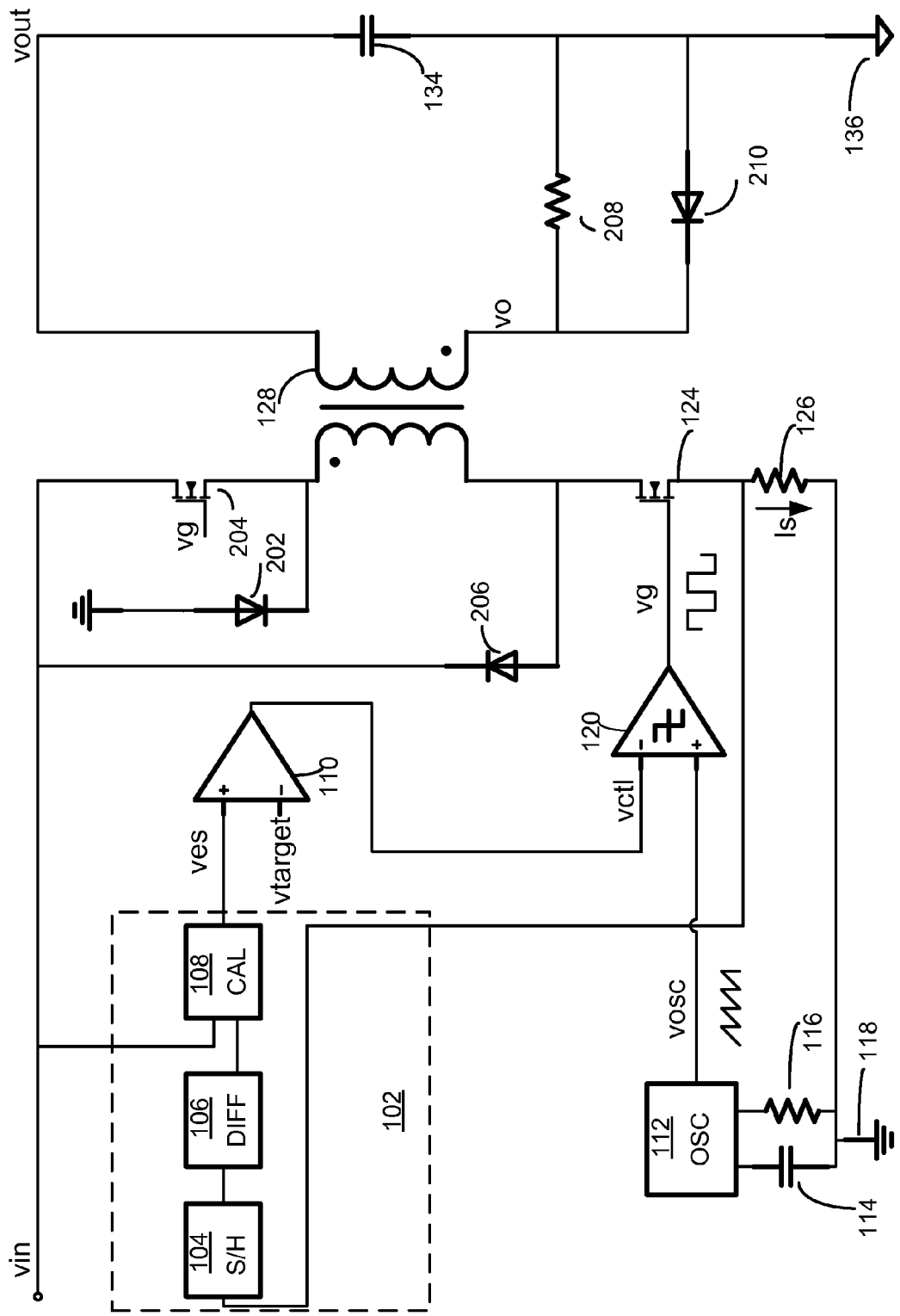
FIG. 2A shows another embodiment of this invention with an isolated flyback type SMPS with dual power switches.
Figure 2B:
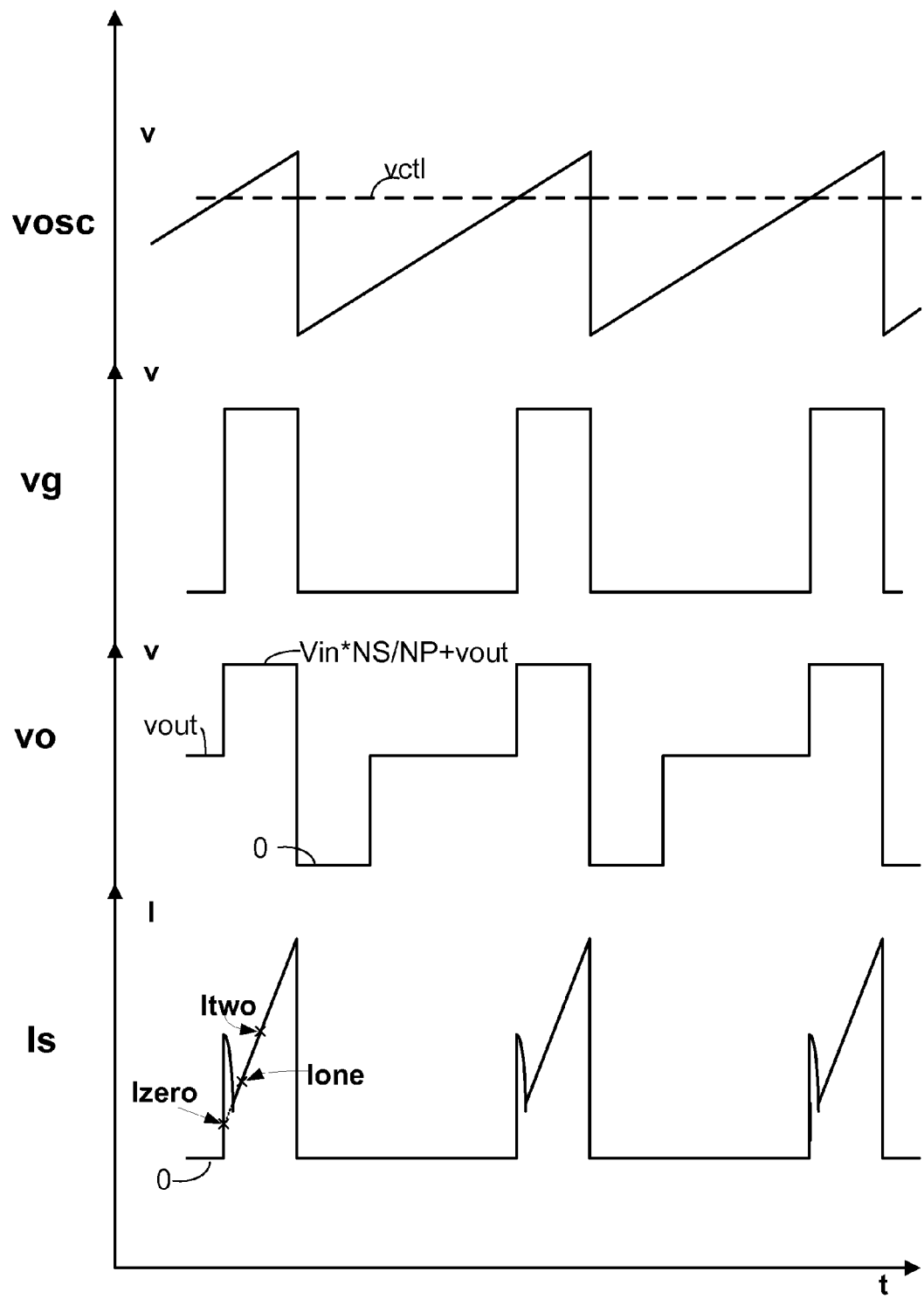
FIG. 2B shows the waveforms for the embodiment in FIG. 2A.

FIG. 2A shows another embodiment of the invention which includes an isolated SMPS working in DCM mode with dual power switches. In addition to the elements similar in FIG. 1A, in FIG. 2A there are also a diode 202 connected between the primary side ground 118 and the dotted-end of the primary side of the power transformer 128, and a power switch 204, which is also a NMOS transistor in this embodiment, connected between the vin and the dotted-end of the primary side of the power transformer 128. The diode 202 is to clamp the voltage at the source of the power switch 204. There is also a diode 206 connected between the vin and the drain of the power switch 124, to clamp the voltage at the drain of the power switch 124. In FIG. 2A, a rectifying element 210 is connected between the secondary side ground 136 and the vo. And a sensing element 208 is connected in parallel with the rectifying element 210. In FIG. 2A, the sensing element 208 and the rectifying element 210 are connected in a so called low-sided rectifying topology, which is different to the so-called high-sided rectifying topology in which the rectifying element 130 and the sensing element 132 are connected in FIG. 1A, to show one of the many possible circuit topology variations. The operation of the embodiment in FIG. 2A is very similar to that described in FIG. 1A. In FIG. 2A, the sensing element 208 generates a sensing current whose scaled version can be measured by the sample and hold circuit 104 at the primary side of the power transformer 128. The calculating circuit 108 calculates the estimate voltage ves which represents the vout, based on the Izero, the vin, the transfer ratio of the SMPS and the resistance of the sensing element 208. The yes is compared to the vtarget by the amplifier 110 and the output is used to control the on and off time of the power switch 124 and 204, so eventually the vout is regulated from the primary side of the power transformer 128.

While the present disclosure describes several embodiments, these embodiments are to be understood as illustrative and do not limit the claim scope. The structures and methods disclosed in this invention can have many variations and modifications such as:

The SMPS can also use current mode control method, in addition to the voltage mode control method shown in the exemplary embodiments, especially since the current of the primary side coil of the power transformer has been measured;

In addition to regulating the output voltage of the isolated SMPS from the primary side, the output current of the isolated SMPS can also be regulated from the primary side. This can be done because the output current is determined by the output voltage and the output power which is equal to the input power for a SMPS working in DCM mode;

The SMPS can have many different circuit topologies, such as but not limited to: having single or dual power switches, having high-sided or low-sided rectifying element, having synchronous rectifying element, or any combinations of them;

The sensing element, instead of being a single resistor, can possibly be a combination of passive components such as resistor, capacitor, inductor and diode, to create a unique signature current which contains the output information, as long as the unique signature current can be measured and recognized by the measuring block at the primary side.

Accordingly, the scope of the invention should be determined not by the embodiments illustrated, but by the appended claims and their legal equivalents.

What is claimed is:

1. An electronic circuit, comprising:
a switched-mode power supply with an input side and an output side isolated from each other,
a sensing element coupled to said output side of said switched-mode power supply, generating a sensing current based on an output voltage on said output side of said switched-mode power supply, and
a measuring means coupled to said input side of said switched-mode power supply, to measure a scaled version of said sensing current and then to calculate an estimate voltage representing said output voltage on said output side of said switched-mode power supply,
said switched mode power supply regulating said output voltage based on said estimate voltage,
whereby said output voltage on said output side of said switched-mode power supply can be regulated from said input side of said switched-mode power supply.

2. The electronic circuit of claim 1 wherein:
said switched-mode power supply is of flyback type, with single or dual power switches.

3. The electronic circuit of claim 1 wherein:
said switched-mode power supply is of flyback type and working in discontinuous conduction mode.

4. The electronic circuit of claim 1 wherein:
said switched-mode power supply is using voltage mode control or current mode control.

5. The electronic circuit of claim 1 wherein:
said sensing element is a or a group of passive components.

6. The electronic circuit of claim 1 wherein:
said sensing element includes at least a resistor.

7. The electronic circuit of claim 1 wherein:
said measuring means includes a sample and hold means to sample said scaled version of said sensing current at a plurality of times.

8. A switched-mode power supply, comprising:
an energy transfer element with a primary side and a secondary side isolated from each other,
at least a power switch coupled to said primary side of said energy transfer element,
at least a rectifying element coupled to said secondary side of said energy transfer element, and
an energy storage element coupled to said rectifying element,
a control means to control said power switch on and off to let energy transferred from said primary side to said secondary side of said energy transfer element, then to said energy storage element through said rectifying element, and
a sensing element coupled to said energy storage element, generating a sensing current based on an output voltage on said energy storage element, and
a measuring means coupled to said primary side of said energy transfer element, to measure a scaled version of said sensing current and therefore to calculate an estimate voltage representing said output voltage on said energy storage element, said estimate voltage used by said control means to control said power switch,
whereby said output voltage on said energy storage element at said secondary side of said energy transfer element can be regulated from said primary side of said energy transfer element.

9. The switched-mode power supply of claim 8 wherein:
said energy transfer element is a transformer.

10. The switched-mode power supply of claim 8 wherein:
said power switch is MOS transistor.

11. The switched-mode power supply of claim 8 wherein:
said energy storage element is a capacitor or a group of capacitors.

12. The switched-mode power supply of claim 8 wherein:
said rectifying element is diode.

13. The switched-mode power supply of claim 8 wherein:
said sensing element is a or a group of passive components.

14. The switched-mode power supply of claim 8 wherein:
said sensing element includes at least a resistor.

15. The switched-mode power supply of claim 8 wherein:
said energy transfer element, said power switch, said rectifying element, and said energy storage element form a flyback type circuit.

16. The switched-mode power supply of claim 15 wherein: said flyback type circuit works in discontinuous conduction mode.

17. The switched-mode power supply of claim 8 wherein: said rectifying element is connected in a high-sided rectifying topology or a low-sided rectifying topology.

18. The switched-mode power supply of claim 8 wherein: said measuring means includes a sample and hold means to sample said scaled version of said sensing current at a plurality of times, to avoid the transient current glitch caused by the turning on of said power switch.

19. The switched-mode power supply of claim 8 wherein: said rectifying element is synchronous rectifier.

20. A method to regulate an output voltage of an output side of an isolated switched-mode power supply from an input side of said isolated switched-mode power supply, comprising steps of:

(a) measuring a scaled version of a sensing current at said input side of said isolated switched-mode power supply, said sensing current generated by a sensing element coupled to said output side of said isolated switched-mode power supply, and said sensing current depending on said output voltage of said output side of said isolated switched-mode power supply, an input power supply voltage at said input side of said isolated switched-mode power supply, the resistance value of said sensing element, and a transfer ratio of said isolated switched-mode power supply, and (b) calculating an estimate voltage which representing said output voltage of said output side of said isolated switched-mode power supply, based on said scaled version of said sensing current measured, said input power supply, the resistance value of said sensing element, and said transfer ratio, and (c) regulating said output voltage of said output side from said input side of said isolated switched-mode power supply based on said estimate voltage.

* * * * *